(12) United States Patent
Morikawa et al.

(10) Patent No.: US 8,461,239 B2
(45) Date of Patent: Jun. 11, 2013

(54) FLAME RETARDANT AGENT FOR THERMOPLASTIC RESIN AND FLAME RETARDANT RESIN COMPOSITION

(75) Inventors: Keisuke Morikawa, Kyoto (JP); Shoji Ichii, Kyoto (JP)

(73) Assignee: Morikawa Shoten Co., Ltd., Kyoto (JP)

( * ) Notice: Subject to any disclaimer, the term of this patent is extended or adjusted under 35 U.S.C. 154(b) by 101 days.

(21) Appl. No.: 13/348,775

(22) Filed: Jan. 12, 2012

(65) Prior Publication Data

US 2012/0108716 A1 May 3, 2012

Related U.S. Application Data

(62) Division of application No. 12/450,903, filed as application No. PCT/JP2008/057645 on Apr. 14, 2008, now abandoned.

(30) Foreign Application Priority Data

Apr. 18, 2007 (JP) ................. 2007-109329

(51) Int. Cl.
*C08K 5/51* (2006.01)
*C01B 25/28* (2006.01)

(52) U.S. Cl.
USPC .......................... 524/145; 423/312

(58) Field of Classification Search
USPC .......................... 524/145; 423/312
See application file for complete search history.

(56) References Cited

U.S. PATENT DOCUMENTS

| 4,242,473 | A | 12/1980 | Nametz et al. |
| 4,417,021 | A | 11/1983 | Nakamura |
| 2002/0115774 | A1 | 8/2002 | Afiouni |
| 2004/0220313 | A1 | 11/2004 | Rogers et al. |
| 2005/0166652 | A1* | 8/2005 | Blount .............................. 71/11 |
| 2008/0108729 | A1 | 5/2008 | Ueda et al. |

FOREIGN PATENT DOCUMENTS

| JP | 59-141478 | 1/1983 |
| JP | 2003-325696 | 11/2003 |
| WO | WO 01/89477 | * 11/2001 |

OTHER PUBLICATIONS

Machine translation of JP 2003-325636 Nov. 2003.
Machine translation of JP 59-141478 Jan. 1983.

* cited by examiner

*Primary Examiner* — John Uselding
(74) *Attorney, Agent, or Firm* — Antonelli, Terry, Stout & Kraus, LLP.

(57) ABSTRACT

A flame retardant agent for a thermoplastic resin, which enables the thermoplastic resin containing the flame retardant agent to keep its viscous property, to be made into a fiber readily, and to exhibit flame retardant effect even when ammonium dihydrogen phosphate is contained in the flame retardant agent as a non-halogen flame retardant component. Also disclosed is a flame retardant resin composition containing the flame retardant agent. Specifically, the flame retardant agent for a thermoplastic resin comprises ammonium dihydrogen phosphate, potassium hydroxide, glycerin and urea, wherein the potassium hydroxide is contained in an amount of 10 to 70 parts by weight, glycerin is contained in an amount of 0.1 to 4.0 parts by weight, and urea is contained in an amount of 1 to 9 parts by weight relative to 100 parts by weight of ammonium dihydrogen phosphate.

10 Claims, No Drawings

US 8,461,239 B2

FLAME RETARDANT AGENT FOR THERMOPLASTIC RESIN AND FLAME RETARDANT RESIN COMPOSITION

CROSS REFERENCE TO RELATED APPLICATION

This application is a divisional application of application Ser. No. 12/450,903, filed Oct. 16, 2009, 371(c) filing date of Apr. 15, 2010, now abandoned, which is a U.S. national phase application of International Application No. PCT/JP2008/057645 filed Apr. 14, 2008, claiming priority of Japanese Application No. 2007-109329 filed Apr. 18, 2007. The disclosure of parent application Ser. No. 12/450,903 is hereby incorporated by reference.

FIELD OF THE ART

The present invention relates to a flame retardant agent for a thermoplastic resin and a flame retardant resin composition obtained by adding the flame retardant agent for a thermoplastic resin to a thermoplastic resin.

BACKGROUND ART

As is well known, halogen compounds and phosphorus/nitrogen compounds exhibit a conspicuous flame retardant effect, and are often used as a flame retardant agent of a thermoplastic resin.

Also, the above described flame retardant agent is essential in a recycling process in which used PET (polyethylene terephthalate) bottles are crushed, washed, and made into source materials again to form polyester fibers. Currently, halogen flame retardant agents made of a bromine compound or a chlorine compound are widely used.

Also, for example, Japanese Patent Application Laid-Open (JP-A) No. 2004-263188 discloses ammonium dihydrogen phosphate as one of the choices for a phosphorus/nitrogen flame retardant component.

The aforesaid conventional halogen flame retardant agent is excellent in a flame retardant effect; however, it raises a problem in that the fibers and the like that are made flame retardant by the halogen flame retardant agent give rise to a cause of generating harmful gases or dioxins at the time of burning.

Also, non-halogen flame retardant agents such as ammonium dihydrogen phosphate produce an effective flame retardant power when added in an amount of 15% by weight or more to the recycled PET resin. However, with this amount of addition, there is raised a problem in that the physical properties of the PET resin decrease and a problem of giving negative effects in a process of forming the PET resin into fibers by deterioration in the physical property.

Inherently, a thermoplastic resin such as polyethylene terephthalate has a poor compatibility with mingled foreign substances, and hence the molecular weight decreases because the molecular chains are cut by hydrolysis or thermal decomposition. Due to this physical property deterioration, the thermoplastic resin loses its viscosity and hence cannot be drawn and extended in a thread form.

Therefore, the present inventors have repetitively conducted sample-making experiments in order to realize a technical goal of providing a flame retardant agent for a thermoplastic resin, which enables a thermoplastic resin containing the flame retardant agent to keep its viscous property, to be made into fibers readily, and to exhibit flame retardant effects even when ammonium dihydrogen phosphate is contained in the flame retardant agent as a non-halogen flame retardant agent, as well as a flame retardant resin composition kneaded and molded after addition of the flame retardant agent. In the process of the experiment, the present inventors have conceived the following idea. Namely, when kneading is carried out after a flame retardant agent is added into a thermoplastic resin, a flame retardant agent having poor dispersibility increases the ratio of the parts where the flame retardant agent is absent, whereby the flame retardant effects are hardly exhibited, and the product will be liable to catch fire. Therefore, in order to ensure a certain flame retardancy by using a flame retardant agent having poor dispersibility, the flame retardant agent must be added in a large amount. Addition of a large amount causes decrease in the melt viscosity of the thermoplastic resin or decrease in the strength, thereby to invite decrease in the fiber-forming property or spinnability. Therefore, in order to impart flame retardancy to a thermoplastic resin having an affluent flammability, it is desirable that the flame retardant agent is dispersed as homogeneously as possible. Further, as the dispersibility is improved more and more, the intrinsic function of the flame retardant agent is exhibited to the maximum extent, and a large flame retardant effect is obtained with addition of a small amount. Further, the improvement in the dispersibility contributes not only to the improvement in the flame retardancy but also to the homogenization of the physical property of the fibers, thereby to decrease the defects at which the stress concentration occurs, leading to an improvement in the strength. On the basis of this idea, the present inventors have further made numerous experiments in a trial-and-error manner for making the PET resin flame retardant by conceiving the use of the used PET bottles as the thermoplastic resin for re-use as fibers.

As a result of the experiments, the present inventors have confirmed that, since ammonium dihydrogen phosphate ($NH_4H_2PO_4$) releases ammonia at around 170° C. to decrease the pH value from 4.7 to 2.5, a flame retardant agent made only of the ammonium dihydrogen phosphate deteriorates the PET resin to decrease the IV value (intrinsic viscosity), and have obtained a remarkable knowledge that, when ammonia is volatilized in advance by allowing potassium hydroxide (KOH) to react with ammonium dihydrogen phosphate in order to prevent the decrease in the IV value, the PET resin having the flame retardant agent added thereto satisfies an IV value that enables fiber forming, thereby achieving the above described technical goal.

DISCLOSURE OF THE INVENTION

A flame retardant agent for a thermoplastic resin according to the invention comprises a flame retardant agent which is a reaction product formed by blending and heating potassium hydroxide and ammonium dihydrogen phosphate, with the potassium hydroxide and ammonium dihydrogen phosphate being reacted in amounts of 10 to 70 parts by weight of potassium hydroxide relative to 100 parts by weight of ammonium dihydrogen phosphate, the flame retardant agent having the property that when added to a resin to obtain a flame retardant resin composition with the amount of the flame retardant agent being 4 to 16% by weight relative to the total amount of the flame retardant resin composition, the flame retardant resin composition is capable of being made into fibers.

Another embodiment of a flame retardant agent for a thermoplastic resin according to the invention comprises a flame retardant agent which is a reaction product formed by blending and heating potassium hydroxide, glycerin and ammonium dihydrogen phosphate, with the potassium hydroxide, glycerin and ammonium dihydrogen phosphate being reacted in amounts of 10 to 70 parts by weight of potassium hydroxide and 0.1 to 4.0 parts by weight of glycerin relative to 100 parts by weight of ammonium dihydrogen phosphate, the flame retardant agent having the property that when added to a resin to obtain a flame retardant resin composition with the amount of the flame retardant agent being 4 to 16% by weight relative to the total amount of the flame retardant resin composition, the flame retardant resin composition is capable of being made into fibers.

A third embodiment of a flame retardant agent for a thermoplastic resin according to the invention comprises a flame retardant agent which is a reaction product formed by blending and heating potassium hydroxide, urea and ammonium dihydrogen phosphate, with the potassium hydroxide, urea and ammonium dihydrogen phosphate being reacted in amounts of 10 to 70 parts by weight of potassium hydroxide and 1 to 9 parts by weight of urea relative to 100 parts by weight of ammonium dihydrogen phosphate, the flame retardant agent having the property that when added to a resin to obtain a flame retardant resin composition with the amount of the flame retardant agent being 4 to 16% by weight relative to the total amount of the flame retardant resin composition, the flame retardant resin composition is capable of being made into fibers.

A still further embodiment of a flame retardant agent for a thermoplastic resin according to the invention comprises a flame retardant agent which is a reaction product formed by blending and heating potassium hydroxide, glycerin, urea and ammonium dihydrogen phosphate, with the potassium hydroxide, glycerin, urea and ammonium dihydrogen phosphate being reacted in amounts of 10 to 70 parts by weight of potassium hydroxide, 0.1 to 4.0 parts by weight of glycerin, and 1 to 9 parts by weight of urea relative to 100 parts by weight of ammonium dihydrogen phosphate, the flame retardant agent having the property that when added to a resin to obtain a flame retardant resin composition with the amount of the flame retardant agent being 4 to 16% by weight relative to the total amount of the flame retardant resin composition, the flame retardant resin composition is capable of being made into fibers.

A flame retardant resin composition according to the present invention is one wherein a flame retardant agent for thermoplastic resin of any one of the aforementioned embodiments of the flame retardant agent of the invention is added to a thermoplastic resin so that the content of the flame retardant agent is 4 to 16% by weight relative to the total amount of the flame retardant resin composition. According to an example embodiment, the thermoplastic resin is polyethylene terephthalate.

According to the present invention, ammonia is volatilized by adding at least potassium hydroxide to ammonium dihydrogen phosphate, so that one can obtain a flame retardant agent in which, even if it is used in a thermoplastic resin, the physical properties of the thermoplastic resin is not deteriorated. Also, since a flame retardant agent obtained by blending potassium hydroxide with ammonium dihydrogen phosphate is added to a thermoplastic resin, resulting resin satisfies an IV value capable of forming fibers, and also a flame retardant effect is obtained, whereby a flame retardant resin composition that can be easily made into fibers can be obtained.

Here, the present inventors infer as follows. In the present invention, in accordance with increase in the amount of added KOH, $NH_4H_2PO_4$ reacts and successively changes to $NH_4KHPO_4$, to $K_2HPO_4$, and to $K_3PO_4$, and a mixture of these chemical species constitute a major component of the flame retardant agent, and also a double decomposition proceeds in parallel. Therefore, including the chemical species that are present in a slight amount, a mixture having a composition of $(NH_4)_nK_mH_pPO_4$ (n or m=0 to 3, p=0 to 2) will be present, and the $(NH_4)_nK_mH_pPO_4$ composition mixture is formed as a particulate crystal that can be easily kneaded, and has a melting point at around the melting temperature of a PET resin, so that it is dispersed and liquefied in a kneading process with the PET resin. Also, $K_3PO_4$ that is partly generated has a melting point having a further higher melting point exceeding 1000° C., so that it contributes to an improvement in the viscosity of the whole, whereby the dispersion or dissolution proceeds with a further higher homogeneity, and a flame retardant effect is obtained.

BEST MODE FOR CARRYING OUT THE INVENTION

Embodiment 1

A flame retardant agent for a thermoplastic resin according to the present embodiment is one such that at least potassium hydroxide (KOH) is blended with ammonium dihydrogen phosphate ($NH_4H_2PO_4$).

Potassium hydroxide is added to ammonium dihydrogen phosphate and further, water is added to form an aqueous solution. Thereafter, the aqueous solution is stirred while being heated (100 to 120° C.) to evaporate water, and ammonia is volatilized to obtain a powder having a particulate crystal form, and the powder is used as a flame retardant agent.

Also, the above described flame retardant agent is added to a thermoplastic resin, and the obtained mixture is heated and kneaded at a temperature higher than or equal to the melting temperature of the thermoplastic resin (for example, 254° C. or higher for a PET resin), and the resultant is molded in a pellet form to obtain a flame retardant resin composition.

When the amount of addition of potassium hydroxide increases, the effect of preventing deterioration of the resin increases when the flame retardant agent is kneaded with a thermoplastic resin such as polyethylene terephthalate (PET), polybutylene terephthalate (PBT), or polyamide 6 (PA). The amount of addition of potassium hydroxide may be 10 to 100 parts by weight, more preferably 10 to 70 parts by weight, relative to 100 parts by weight of ammonium dihydrogen phosphate. Further, when the amount of addition is 50 to 70 parts by weight, an optimum effect on melting property and dispersibility will be obtained.

Here, the above described flame retardant agent acts effectively on a chain-form polymer having an ester bond or an amide bond in a main chain, and also acts effectively on a thermoplastic resin of a polylactic acid resin (PLA) in which lactic acid is polymerized by an ester bond.

In flame retardant resin compositions, the IV value capable of forming fibers is generally assumed to be 0.66, 0.67 or more and, since the product quality standard of the recycled PET flake is such that the IV value is 0.65 to 0.75, the amount of addition of the flame retardant agent to a thermoplastic resin is preferably such that the IV value will be 0.66 to 0.75. When the amount of addition increases, it induces deterioration of the physical properties, so that the amount of addition must be restrained. Namely, the flame retardant agent is preferably added to the thermoplastic resin in a small amount of 4 to 16% by weight relative to the total amount so that the IV value will satisfy 0.66 to 0.75.

Embodiment 2

A flame retardant agent for a thermoplastic resin according to the present embodiment is one such that potassium hydroxide (KOH) and glycerin ($C_3H_5(OH)_3$) are blended with ammonium dihydrogen phosphate ($NH_4H_2PO_4$).

Potassium hydroxide and glycerin are added to ammonium dihydrogen phosphate, and further, water is added to form an aqueous solution. Thereafter, the aqueous solution is stirred while being heated (100 to 120° C.) to evaporate water, and ammonia is volatilized to obtain a powder having a particulate crystal form, and the powder is used as a flame retardant agent.

Also, the above described flame retardant agent is added to a thermoplastic resin, and the obtained mixture is kneaded at a temperature higher than or equal to the melting temperature of the thermoplastic resin, and the resultant is molded in a pellet form to obtain a flame retardant resin composition.

By addition of $C_3H_5(OH)_3$ (glycerin), a high IV value is obtained in kneading with a thermoplastic resin, and, at the same time, the compatibility and the dispersibility will be improved. Phosphoric acid forms an ester when heated with various alcohols as represented by $ROH+HX_2PO_4->(RO)X_2PO_4+H_2O$ (X is H, a cation, or an organic residue), so that, by addition of $C_3H_5(OH)_3$, it is inferred that a phosphoric acid ester is formed. Further, a phosphoric acid derivative such as a phosphoric acid ester has a property of being dehydrated at a high temperature to form a condensation product having a high molecular weight (metaphosphoric acid derivative or the like), so that a glycerin ester of phosphoric acid has a high solubility to an organic substance, and therefore is inferred to help a phosphorus compound be dissolved and dispersed into a polymer. However, a phosphoric acid ester or glycerin itself is inferior in terms of flame retardancy, so that glycerin is preferably added in a suitable amount, and is preferably added in an amount of 0 to 4.0 parts by weight, more preferably in an amount of 0.1 to 4.0 parts by weight, relative to 100 parts by weight of ammonium dihydrogen phosphate. Here, potassium hydroxide may be added in an amount of 10 to 70 parts by weight.

In the flame retardant resin composition, the flame retardant agent may be added to the thermoplastic resin in an amount of 4 to 16% by weight relative to the total amount.

Embodiment 3

A flame retardant agent for a thermoplastic resin according to the present embodiment is one such that potassium hydroxide (KOH) and urea ($CO(NH_2)_2$) are added to ammonium dihydrogen phosphate ($NH_4H_2PO_4$).

Potassium hydroxide and urea are added to ammonium dihydrogen phosphate and further, water is added to form an aqueous solution. Thereafter, the aqueous solution is stirred while being heated (100 to 120° C.) to evaporate water, and ammonia is volatilized to obtain a powder having a particulate crystal form, and the powder is used as a flame retardant agent.

Also, the above described flame retardant agent is added to a thermoplastic resin, and the obtained mixture is kneaded at a temperature higher than or equal to the melting temperature of the thermoplastic resin, and the resultant is molded in a pellet form to obtain a flame retardant resin composition.

By addition of $CO(NH_2)_2$ (urea), the thermoplastic resin and the flame retardant agent are melted easily, whereby the flame retardant power is improved. It is inferred that $CO(NH_2)_2$ not only is expected to produce an effect of keeping the concentration of ammonium salt constant as a supply source of ammonia, but also generates a nitrogen-containing condensation product by passing through a complex reaction at a high temperature, which contributes to the flame retardancy or solubility. However, the effect of addition exceeding a suitable amount cannot be expected, so that it may be added in an amount of 0 to 9 parts by weight, more preferably in an amount of 1 to 7.5 or 9 parts by weight, still more preferably in an amount of 1 to 2 parts by weight, relative to 100 parts by weight of ammonium dihydrogen phosphate. Here, potassium hydroxide may be added in an amount of 10 to 70 parts by weight.

In the flame retardant resin composition, the flame retardant agent may be added to the thermoplastic resin in an amount of 4 to 16% by weight relative to the total amount.

Embodiment 4

A flame retardant agent for a thermoplastic resin according to the present embodiment is one such that potassium hydroxide (KOH), glycerin ($C_3H_5(OH)_3$), and urea ($CO(NH_2)_2$) are added to ammonium dihydrogen phosphate ($NH_4H_2PO_4$).

Potassium hydroxide, glycerin, and urea are added to ammonium dihydrogen phosphate, and further, water is added to form an aqueous solution. Thereafter, the aqueous solution is stirred while being heated (100 to 120° C.) to evaporate water, and ammonia is volatilized to obtain a powder having a particulate crystal form, and the powder is used as a flame retardant agent.

Also, the above described flame retardant agent is added to a thermoplastic resin, and the obtained mixture is kneaded at a temperature higher than or equal to the melting temperature of the thermoplastic resin, and the resultant is molded in a pellet form to obtain a flame retardant resin composition.

Here, in the flame retardant agent according to the present embodiment, potassium hydroxide may be added in an amount of 10 to 70 parts by weight; glycerin may be added in an amount of 0.1 to 4.0 parts by weight; and urea may be added in an amount of 1 to 9 parts by weight. In the flame retardant resin composition, the flame retardant agent may be added to the thermoplastic resin in an amount of 4 to 16% by weight relative to the total amount.

Examples 1 to 19

Ammonium dihydrogen phosphate, potassium hydroxide, glycerin, and urea were blended in a parts-by-weight ratio shown in Table 1 and Table 2, and 100 parts by weight of water was added to the resultant mixture to form an aqueous solution. Thereafter, the aqueous solution was stirred while being heated at 100 to 120° C. to evaporate water, and ammonia was volatilized to obtain a powder having a particulate crystal form, and the powder was used as each flame retardant agent.

Next, a PET flake obtained by crushing and washing a used PET bottle was prepared, and each of the flame retardant agents of Examples 1 to 19 was added so that the amount of addition would attain a blending ratio shown in Table 1 and Table 2 relative to a sum of the amounts of the flame retardant agent and the PET flake. After the resultant was stirred and mixed with use of a mixer, a yarn was molded and cut with use of a twin screw extruder at a high temperature of 250° C. or more, so as to obtain each flame retardant resin composition having a pellet form.

elastic thread form without being cut in the process of drawing; "○" shows that there is no unevenness and it can be drawn in a thread form without being cut; and "Δ" shows that

TABLE 1

| | Examples | | | | | | | | | |
|---|---|---|---|---|---|---|---|---|---|---|
| | 1 | 2 | 3 | 4 Reference Example | 5 Reference Example | 6 | 7 Reference Example | 8 | 9 | 10 |
| $NH_4H_2PO_4$ | 100 | 100 | 100 | 100 | 100 | 100 | 100 | 100 | 100 | 100 |
| KOH | 11.4 | 67.4 | 70 | 100 | 75 | 65 | 80 | 67.4 | 67.4 | 67.4 |
| $C_3H_5(OH)_3$ | 0.76 | 0.4 | 0.4 | 0.4 | 0.4 | 0.4 | 0.4 | | 0.2 | 0.6 |
| $CO(NH_2)_2$ | | | | | | | | | | |
| pH | 6.3 | 6.4 | 6.5 | 8.6 | 6.8 | 6.4 | 7.0 | 6.4 | 6.4 | 6.4 |
| pH after burning | 2.7 | 6.5 | 6.7 | 9.0 | 7.4 | 6.2 | 7.9 | 6.5 | 6.5 | 6.5 |
| Amount of addition of flame retardant agent | 5% | 6% | 6% | 6% | 6% | 6% | 6% | 6% | 6% | 6% |
| Flame retardancy evaluation | ⊙ | ○ | ○ | ○ | ○ | ○ | ○ | ○ | ○ | Δ |
| Molten state | Good | Good | Good | Unevenness is present | Unevenness is present | Good | Unevenness is present | Good | Good | Good |
| Thread drawing after kneading | ○ | ⊙ | ⊙ | Δ | Δ | ⊙ | Δ | ○ | ○ | ⊙ |

TABLE 2

| | Examples | | | | | | | | |
|---|---|---|---|---|---|---|---|---|---|
| | 11 | 12 | 13 | 14 | 15 | 16 | 17 | 18 | 19 |
| $NH_4H_2PO_4$ | 100 | 100 | 100 | 100 | 100 | 100 | 100 | 100 | 100 |
| KOH | 67.4 | 11.4 | 40 | 40 | 50 | 67.4 | 67.4 | 67.4 | 67.4 |
| $C_3H_5(OH)_3$ | 0.8 | 0.189 | 0.4 | 0.4 | 0.4 | 0.4 | 0.4 | 0.4 | 0.4 |
| $CO(NH_2)_2$ | | | | 1 | | | 2 | 4 | 1 |
| pH | 6.4 | 6.3 | 6.0 | 6.0 | 5.5 | 6.4 | 6.7 | 6.5 | 6.5 |
| pH after burning | 6.5 | 2.7 | 2.9 | 3.4 | 4.4 | 6.5 | 6.3 | 6.2 | 6.5 |
| Amount of addition of flame retardant agent | 6% | 5% | 6% | 6% | 6% | 6% | 6% | 6% | 6% |
| Flame retardancy evaluation | Δ | ⊙ | ○ | ○ | ○ | ○ | ○ | Δ | ○ |
| Molten state | Good | Good | Good | Good | Good | Good | Good | Good | Good |
| Thread drawing after kneading | ⊙ | ○ | ○ | ○ | ○ | ⊙ | ○ | ○ | ○ |

Here, in Table 1 and Table 2, the units of "$NH_4H_2PO_4$", "KOH", "$C_3H_5(OH)_3$", and "$CO(NH_2)_2$" are parts by weight; the "pH" represents a value in a 5% aqueous solution of the flame retardant agent; and the "pH after burning" represents a value in a 5% aqueous solution after each flame retardant agent is burnt at 200° C. Also, the "flame retardancy evaluation" was carried out by adding the flame retardant agent to the PET flake so as to attain wt % respectively shown by "flame retardant agent addition amount" relative to the total amount, melting the resultant in a liquid form at a temperature of 254.3° C. or higher at which the PET flake is melted, so as to mold it in a plate form, which is then finely ground in a granular form to obtain each of the flame retardant resin composition test pieces, mounting the test piece on a thick paper having a thickness of 0.4 mm, putting the thick paper over fire, and observing how the test piece was burnt. The symbol "⊙" shows that the test piece did not catch fire even after the paper was completely burnt; the symbol "○" shows that the peripheries of the test piece caught fire but the fire was quenched after several seconds; and the symbol "Δ" shows that the test piece once caught fire, but the fire was self-quenched. Also, the "molten state" shows the molten state of the PET resin added with the flame retardant agent at the time of kneading. In the "thread drawing after kneading", "⊙" shows that there is no unevenness and it can be drawn into an a little unevenness is generated even though it is melted, and it cannot be drawn in a uniform thread form.

Though the pH in a 5% aqueous solution after each of the flame retardants of Examples 1 and 12 to 15 is burnt at 200° C. is acidic, a good result is obtained in the flame retardancy evaluation and the thread drawing after kneading when the flame retardant agent is added in a small amount of 5 to 6% by weight. Here, in order to obtain a flame retardant resin composition by the flame retardant agent, an extruder subjected to an anticorrosion treatment may be used.

The IV value and the oxygen index (determination: flammability test No. E-2) were measured with respect to the flame retardant resin composition using the flame retardant agent of Example 1, with a result that the IV value was 0.673 and the oxygen index was 35.1.

In the flame retardant resin composition using each of the flame retardant agents of Reference Examples 4, 5, and 7, a little unevenness was generated in the dispersion of the flame retardant agent in the molten state at the time of kneading, and it could not be drawn in a uniform thread form though it could be drawn in a thread form. However, a flame retardant effect was sufficiently obtained.

Example 20

A mixture was obtained by mixing 100 parts by weight of ammonium dihydrogen phosphate, 11.4 parts by weight of potassium hydroxide, 3 parts by weight of glycerin, 6 parts by weight of urea, and 0.6 part by weight of borax, and then 100 parts by weight of water was added to form an aqueous solution. Thereafter, the aqueous solution was stirred while being heated at 100 to 120° C. to evaporate water, and ammonia was volatilized to obtain a powder having a particulate crystal form, and the powder was used as a flame retardant agent.

Next, a PA flake obtained by crushing PA (Toray 6-nylon: type number CM-1021) was prepared, and the flame retardant agent was added so that the amount of addition would be 5, 6, 7, 8, and 10% by weight relative to a sum of the amounts of the flame retardant agent and the PA flake. After stirring and mixing with use of a mixer, a yarn was molded and cut with use of a twin-screw extruder at a high temperature of 225° C. or higher, which is the melting point of the PA, so as to obtain each flame retardant resin composition having a pellet form.

The pH value of this flame retardant agent in a 5% aqueous solution was 6.2. Also, the flame retardancy evaluation of each flame retardant resin composition was such that the evaluation was "Δ" in the flame retardant resin composition with an amount of addition of 5 to 7% by weight, and the evaluation was "○" in the flame retardant resin composition with an amount of addition of 8, 10% by weight.

Example 21

To 89% by weight of a PET flake obtained by crushing and washing a used PET bottle, 5% by weight of the flame retardant agent of Example 12, 5% of a PA flake obtained by crushing PA (Toray 6-nylon: type number CM-1021), and 1% by weight of an antioxidant (trade name: IRGANOX B-561 manufactured by Chiba Specialty Chemicals Co., Ltd.) were added. After stirring and mixing with use of a mixer, a yarn was molded and cut with use of a twin-screw extruder at a high temperature higher than or equal to the melting point of the PET (260 to 280° C.), so as to obtain a flame retardant resin composition having a pellet form. The flame retardant resin composition could be easily made into fibers, and at the same time was non-flammable.

Examples 22 to 24

To 88.8% by weight of the PET flake, 6% by weight of the flame retardant agent of Example 13, 5% of the PA flake, and 0.2% by weight of an antioxidant (trade name: Adecastab AO-60 manufactured by Asahi Denka Industry Co., Ltd.) were added. After stirring and mixing with use of a mixer, a yarn was molded and cut with use of a twin-screw extruder at a high temperature higher than or equal to the melting point of the PET (260 to 280° C.), so as to obtain a flame retardant resin composition having a pellet form (Example 22). Also, to 88% by weight of the PET flake, 7% by weight of the flame retardant agent of Example 13 and 5% of the PA flake were added. After stirring and mixing with use of a mixer, a yarn was molded and cut with use of a twin-screw extruder at a high temperature higher than or equal to the melting point of the PET (260 to 280° C.), so as to obtain a flame retardant resin composition having a pellet form (Example 23). Also, to 92.8% by weight of the PET flake, 7% by weight of the flame retardant agent of Example 13 and 0.2% by weight of an antioxidant (trade name: Adecastab AO-60 manufactured by Asahi Denka Industry Co., Ltd.) were added. After stirring and mixing with use of a mixer, a yarn was molded and cut with use of a twin-screw extruder at a high temperature higher than or equal to the melting point of the PET (260 to 280° C.), so as to obtain a flame retardant resin composition having a pellet form (Example 24). Each of the flame retardant resin compositions (Examples 22 to 24) could be easily made into fibers, and a flame retardant effect of self-quenching is obtained, so that it is particularly suitable for use in an automobile.

Example 25

To 91.8% by weight of the PET flake, 8% by weight of the flame retardant agent of Example 19 and 0.2% by weight of an antioxidant (trade name: Adecastab AO-60 manufactured by Asahi Denka Industry Co., Ltd.) were added. After stirring and mixing with use of a mixer, a yarn was molded and cut with use of a twin-screw extruder at a high temperature higher than or equal to the melting point of the PET (260 to 280° C.), so as to obtain a flame retardant resin composition having a pellet form.

Comparative Example 1

An aqueous solution was obtained by adding 100 parts by weight of water to 100 parts by weight of ammonium dihydrogen phosphate. Thereafter, the aqueous solution was stirred while being heated at 100 to 120° C. to evaporate water, and ammonia was volatilized to obtain a powder having a particulate crystal form, The "pH" value of the 5% aqueous solution of the power was 4.7, and the "after-burning pH" value in the 5% aqueous solution after burning at 200° C. was 2.5. The IV value of the PET resin in which the powder was added in a "flame retardant agent addition amount" of 5% by weight showed 0.629, and an IV value capable of forming PET fibers could not be obtained with this addition amount.

Comparative Example 2

A mixture was obtained by mixing 100 parts by weight of ammonium dihydrogen phosphate, 3 parts by weight of glycerin, and 6.1 parts by weight of urea, and then 100 parts by weight of water was added to form an aqueous solution. Thereafter, the aqueous solution was stirred while being heated at 100 to 120° C. to evaporate water, and ammonia was volatilized to obtain a powder having a particulate crystal form, The "pH" value of the 5% aqueous solution of the powder was 5.2, and the "after-burning pH" value in the 5% aqueous solution after burning at 200° C. was 2.9. The IV value of the PET resin in which the powder was added in a "flame retardant agent addition amount" of 5% by weight showed 0.637, and an IV value capable of forming PET fibers could not be obtained with this addition amount.

According to the present invention, a flame retardant agent for a thermoplastic resin that can be easily made into fibers while maintaining the viscosity which is a physical property of the thermoplastic resin and at the same time is excellent in flame retardancy can be provided, so that the problems inherent in halogen flame retardant agents of generating harmful gases or dioxins can be solved, thereby contributing to the environmental protection.

What is claimed is:

1. A flame retardant agent for a thermoplastic resin, the flame retardant agent being a reaction product formed by blending and heating potassium hydroxide, glycerin and ammonium dihydrogen phosphate, with the potassium hydroxide, glycerin and ammonium dihydrogen phosphate being reacted in amounts of 10 to 70 parts by weight of potassium hydroxide and 0.1 to 4.0 parts by weight of glycerin relative to 100 parts by weight of ammonium dihydrogen phosphate.

2. A flame retardant resin composition, wherein the flame retardant agent for thermoplastic resin according to claim 1 is added to a thermoplastic resin so that the content of the flame retardant agent is 4 to 16% by weight relative to the total amount of the flame retardant resin composition.

3. The flame retardant resin composition according to claim 2, wherein the thermoplastic resin is polyethylene terephthalate.

4. A flame retardant agent for a thermoplastic resin, the flame retardant agent being a reaction product formed by blending and heating potassium hydroxide, glycerin, urea and ammonium dihydrogen phosphate, with the potassium hydroxide, glycerin, urea and ammonium dihydrogen phosphate being reacted in amounts of 10 to 70 parts by weight of potassium hydroxide, 0.1 to 4.0 parts by weight of glycerin, and 1 to 9 parts by weight of urea relative to 100 parts by weight of ammonium dihydrogen phosphate.

5. A flame retardant resin composition, wherein the flame retardant agent for thermoplastic resin according to claim 4 is added to a thermoplastic resin so that the content of the flame retardant agent is 4 to 16% by weight relative to the total amount of the flame retardant resin composition.

6. The flame retardant resin composition according to claim 5, wherein the thermoplastic resin is polyethylene terephthalate.

7. The flame retardant resin composition according to claim 6 is capable of being made into fibers.

8. The flame retardant resin composition according to claim 5 is capable of being made into fibers.

9. The flame retardant resin composition according to claim 2 is capable of being made into fibers.

10. The flame retardant resin composition according to claim 3 is capable of being made into fibers.

* * * * *